US012737971B2

(12) United States Patent
Daha et al.

(10) Patent No.: US 12,737,971 B2
(45) Date of Patent: Sep. 15, 2026

(54) METHOD AND SYSTEM OF GENERATING CUSTOMIZED THREE-DIMENSIONAL IMAGES

(71) Applicant: Microsoft Technology Licensing, LLC, Redmond, WA (US)

(72) Inventors: Fatima Zohra Daha, Livemore, CA (US); Ji Li, San Jose, CA (US); Dachuan Zhang, Sunnyvale, CA (US); Han Hu, Beijing (CN); Houwen Peng, Beijing (CN); Jianmin Bao, Beijing (CN); Ruizhe Wang, Hefei (CN); Dong Chen, Beijing (CN); Hanqing Zhao, Hefei (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 18/319,536

(22) Filed: May 18, 2023

(65) Prior Publication Data

US 2024/0386661 A1 Nov. 21, 2024

(51) Int. Cl.
*G06T 17/00* (2006.01)
*G06T 7/174* (2017.01)

(52) U.S. Cl.
CPC .............. *G06T 17/00* (2013.01); *G06T 7/174* (2017.01); *G06T 2207/20081* (2013.01)

(58) Field of Classification Search
CPC ..................... G06T 7/174; G06T 17/00; G06T 2207/20081; G06F 40/30; G06F 3/048; G06N 3/00
USPC .......................................................... 345/418
See application file for complete search history.

(56) References Cited

U.S. PATENT DOCUMENTS

| | | | | |
|---|---|---|---|---|
| 12,205,207 | B2 * | 1/2025 | Smetanin | G06F 3/0482 |
| 2014/0047429 | A1 | 2/2014 | Gaither | |
| 2019/0294878 | A1 | 9/2019 | Endras | |
| 2019/0303403 | A1 | 10/2019 | More | |
| 2022/0374602 | A1 | 11/2022 | Park | |
| 2023/0205133 | A1 * | 6/2023 | Matusik | G03H 1/04 359/9 |
| 2023/0377226 | A1 * | 11/2023 | Saharia | G06V 10/82 |
| 2024/0119681 | A1 * | 4/2024 | Sholl | G06T 5/77 |

(Continued)

OTHER PUBLICATIONS

Poole B, Jain A, Barron JT, Mildenhall B. Dreamfusion: Text-to-3d using 2d diffusion. arXiv preprint arXiv:2209.14988. Sep. 2, 20229.*

(Continued)

*Primary Examiner* — Phu K Nguyen
(74) *Attorney, Agent, or Firm* — NovoTechIP International PLLC

(57) ABSTRACT

A data processing system includes: a processor; a memory storing executable instructions which, when executed by the processor, cause the processor, alone or in combination with other processors, to implement a client application with a user interface. The client application is configured to: receive an image depicting an object; generate a fine-tuning input to an image-generating Artificial Intelligence (AI) model to associate image data of the object with an identifier; with the fine-tuning input, fine-tune the AI model; structure a prompt for the AI model using the identifier; and obtain from the AI model a new customized image that depicts the object while preserving an appearance of the object.

15 Claims, 8 Drawing Sheets

(56) References Cited

U.S. PATENT DOCUMENTS

| | | | | |
|---|---|---|---|---|
| 2024/0282130 | A1 | 8/2024 | Green | |
| 2024/0296595 | A1 | 9/2024 | Daha | |
| 2024/0412720 | A1* | 12/2024 | Vasylyev | G06F 16/33295 |
| 2025/0078453 | A1* | 3/2025 | Saraee | G06F 16/438 |
| 2025/0078454 | A1* | 3/2025 | Saraee | G06V 10/40 |

OTHER PUBLICATIONS

Oh BM, Chen M, Dorsey J, Durand F. Image-based modeling and photo editing. InProceedings of the 28th annual conference on Computer graphics and interactive techniques Aug. 1, 2001 (pp. 433-442).*

Chien SY, Ma SY, Chen LG. Efficient moving object segmentation algorithm using background registration technique. IEEE Transactions on Circuits and Systems for Video Technology. Jul. 31, 2002;12(7):577-86.*

Zhang GM, Chen SP, Liao JN. Otsu image segmentation algorithm based on morphology and wavelet transformation. In2011 3rd International Conference on Computer Research and Development Mar. 11, 2011 (vol. 1, pp. 279-283). IEEE.*

Gal, et al., "An Image is Worth One Word: Personalizing Text-to-Image Generation using Textual Inversion", arXiv preprint arXiv:2208.01618, Aug. 2, 2022, 26 pages.

International Search Report and Written Opinion received for PCT Application No. PCT/US2024/017368, Jul. 10, 2024, 16 pages.

Rinon Gal, "GitHub—rinongal/textual inversion", Retrieved from the Internet URL: https://web.archive.org/web/20230210010752/https://github.com/rinongal/textual_inversion, Feb. 10, 2023, pp. 1-7.

Ruiz, et al., "DreamBooth: Fine Tuning Text-to-Image Diffusion Models for Subject-Driven Generation", Proceedings of the IEEE/CVF Conference on Computer Vision and Pattern Recognition (CVPR), Aug. 25, 2023, pp. 22500-22510.

U.S. Appl. No. 18/176,668, filed Mar. 1, 2023.

International Search Report and Written Opinion received for PCT Application No. PCT/US2024/026913, Jul. 19, 2024, 15 pages.

Kumari, et al., "Multi-Concept Customization of Text-to-Image Diffusion", Proceedings of the IEEE/CVF Conference on Computer Vision and Pattern Recognition (CVPR), 2023, pp. 1931-1941.

Tang, et al., "Make-It-3D: High-fidelity 3D Creation from A Single Image with Diffusion Prior", Proceedings of the IEEE/CVF International Conference on Computer Vision (ICCV), Apr. 3, 2023, pp. 1-17.

Wei, et al., "ELITE: Encoding Visual Concepts into Textual Embeddings for Customized Text-to-Image Generation", Proceedings of the IEEE/CVF International Conference on Computer Vision (ICCV), 2023, pp. 15943-15953.

Zhang, et al., "Personalize Segment Anything Model with One Shot", arXiv preprint arXiv:2305.03048, May 4, 2023, 14 pages.

Ding, et al., "CogView: Mastering Text-to-Image Generation via Transformers", In Proceedings of the 35th International Conference on Neural Information Processing Systems, Dec. 2021, 14 Pages.

Non-Final Office Action mailed on Jul. 1, 2025 in U.S. Appl. No. 18/176,668, 13 Pages.

Ramesh, et al., "Zero-shot text-to-image generation", In Proceedings of the 38th International Conference on Machine Learning, Jul. 2021, 11 Pages.

Saharia et al., "Photorealistic text-to-image diffusion models with deep language understanding", In Proceedings of the 36th International Conference on Neural Information Processing Systems, Nov. 2022, 16 Pages.

International Preliminary Report on Patentability (Chapter I) received for PCT Application No. PCT/US2024/017368, mailed on Sep. 11, 2025, 11 pages.

International Preliminary Report on Patentability (Chapter I) received for PCT Application No. PCT/US2024/026913, Mailed on Nov. 27, 2025, 10 Pages.

Final Office Action mailed on Oct. 21, 2025, in U.S. Appl. No. 18/176,668, 16 pages.

Non-Final Office Action mailed on Feb. 18, 2026, in U.S. Appl. No. 18/176,668, 14 pages.

Final Office Action mailed on Jun. 3, 2026, in U.S. Appl. No. 18/176,668, 17 pages.

* cited by examiner 260
210
212
Processor 251
Client application 214
User Interface 240
Fine-tuning tool 242
Fine-tuning input 246
Prompt engine 244
Prompt 248
Object image 104
Background image 105
Text instructions 106
Memory 252
Network 208
201
Identifier(s) 261
Image data 262
206
3D image generating AI model 107
Output domain 250
Fine-tuning input 246
Output 3D image 108
220
Image segmentation AI model 227
Prompt 248
2D image of object 104

Receive image containing object
410

Other objects in image?
412

YES

NO

Segment image to isolate image of object
414

Fine-tune image generating AI model with a token associated with object/background image(s)
416

Prompt fine-tuned image generating AI model for 3D image of product/background
418

Output 3D image of product/background
420

METHOD AND SYSTEM OF GENERATING CUSTOMIZED THREE-DIMENSIONAL IMAGES

BACKGROUND

The visual appearance of an object or a scene can be captured and depicted in a recorded image, such as a photograph or drawing. Images can also be created that depict imagined content. These images can be rendered, e.g., printed, on a physical medium or can be digital and displayed electronically. In either case, the image is two-dimensional (2D). Additionally, an object, whether real or imagined, can also be represented by a three-dimensional (3D) data model that captures features such as the object's shape, dimensions, surface texture, etc.

Existing technologies allow for the creation of a 3D data model from a 2D image. Photogrammetry is the art and science of extracting 3D information from photographs. Specifically, photogrammetry is a technique that involves taking multiple overlapping 2D images of an object or scene from different angles and using software to generate a 3D model. The software matches common features in the images and uses triangulation to calculate the 3D position of each point. The more 2D images from different angles that are used, the more complete and accurate the 3D model can be made.

SUMMARY

In one general aspect, the instant disclosure presents a data processing system includes: a processor; a memory storing executable instructions which, when executed by the processor, cause the processor, alone or in combination with other processors, to implement a client application with a user interface. The client application is configured to: receive an image depicting an object; generate a fine-tuning input to an image-generating Artificial Intelligence (AI) model to associate image data of the object with an identifier; with the fine-tuning input, fine-tune the AI model; structure a prompt for the AI model using the identifier; and obtain from the AI model a new customized image that depicts the object while preserving an appearance of the object.

In another general aspect, the instant disclosure presents a non-transitory computer-readable medium comprising instructions for a client application for execution by a processor, alone or in combination with other processors. The client application comprises: a user interface to receive input images and input text; a fine-tuning tool to generate a fine-tuning input to an image-generating Artificial Intelligence (AI) model to associate image data of an object with an identifier using an image of the object input through the user interface; the fine-tuning tool to implant the fine-tuning input in an output domain of the AI model; a prompt engine to structure a prompt for the AI model using the identifier and to obtain from the AI model a new customized image that depicts the object based on the prompt while preserving an appearance of the object.

In another general aspect, the instant disclosure presents a method of generating a customized three-dimensional image including: receiving an image depicting an object; generating a fine-tuning input to an image-generating Artificial Intelligence (AI) model to associate image data of the object with an identifier; with the fine-tuning input, fine-tuning the AI model; structuring a prompt for the AI model using the identifier; and obtaining from the AI model a new customized image that depicts the object while preserving an appearance of the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
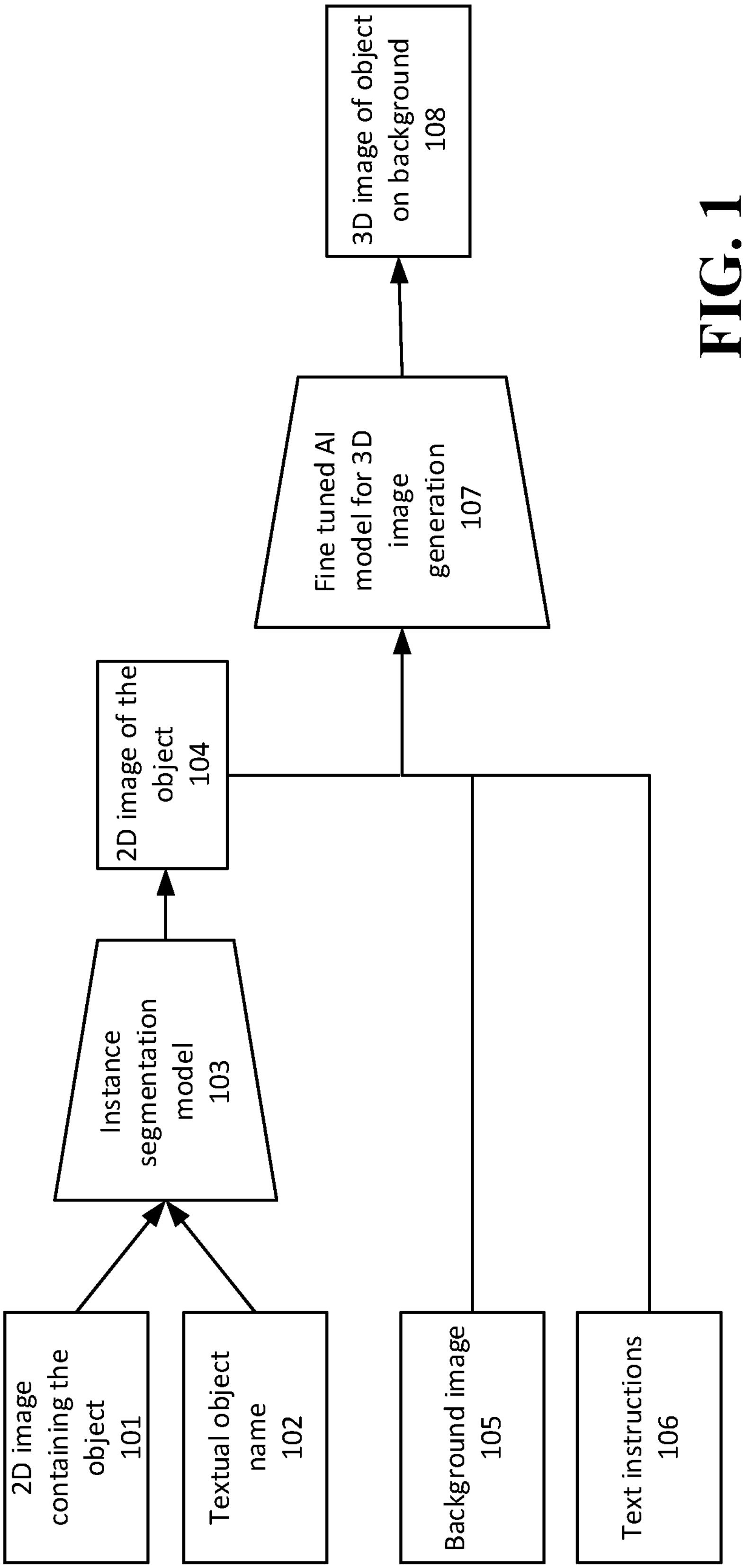
FIG. 1 depicts an illustrative system in which aspects of this disclosure may be implemented.

A 3D model is a digital representation of a three-dimensional object or scene created using specialized software. The model contains information about the shape, size, texture, and other properties of the object or scene. 3D models are typically created using 3D modeling software and can be used for various purposes, including animation, video games, architecture, product design, and more. A 3D model is simply digital data.

On the other hand, a 3D image is a rendered representation of a 3D model that has been converted into a 2D image or video. Consequently, producing a 3D image typically involves constructing a 3D model from which the 3D image can then be generated. In other words, a 3D image is the final result of rendering a 3D model with lighting, shading, textures, and other visual effects to create a realistic or stylized image or video. 3D images are used in various applications, including advertising, entertainment, and visualization. In the following description, the terms "3D image" and "3D visualization" are used synonymously.

In a variety of applications, a user may want to create a 3D image that visualizes a specific object in a specific setting or on a particular background. For example, the user may want to see a visualization of a particular piece of furniture in a specific room or setting. A manufacturer or vendor may want to see a visualization of a project with a particular background for advertising purposes. The user may have ready access to 2D images of the object or setting, but no effective way of converting those 2D images into the desired 3D image. This is a technical problem for which technical solutions have been evolving.

For example, in addition to photogrammetry, described above, and other techniques, Artificial Intelligence (AI) is now being applied to the generation of 3D models from 2D images. Generative Pre-Training Transformer (GPT) technology is a technology that was first applied to text generation. GPT includes a neural network machine learning model that is trained using vast amounts of internet data. As a result, a GPT engine can receive a textual input and generate, in response, a much larger volume of relevant and sophisticated machine-generated text. More recently, this technology has moved beyond textual applications. Another AI engine, Image GPT, has shown that the same type of neural network can also be used to generate images as the output. DALL-ET™ and Stable Diffusion™ are current generative AI models trained to output images in response to a text input. Such image generation methods have many applications.

Generally, AI engines for image generation receive an input that describes the image to be produced. From that description, the AI engine will generate a corresponding output image that conforms to the input description. When this input is a text description of the image to be produced, the process is referred to as a text-to-image transformation. For example, the user may input a request for an image of "a collection of glasses sitting on a table" and receive an image meeting this description as the output. The user may also request the style of the output image. For example, the input could specify that the output is to be a photograph, a pencil sketch or a cartoon. The AI will then generate the image according to the specified style. Thus, the collection of glasses sitting on a table could appear as a photograph or a pencil sketch depending on the input request.

As noted above, the conversion of 2D images to 3D images has been used in many different fields, and there are multiple models and software that help users convert their 2D images to 3D models or images. However, existing approaches usually require multiple 2D images from multiple, different views in order to generate acceptable results in a 3D model. These approaches tend to perform poorly on any classes that have not been represented in the configuration or training of the tool.

Additionally, users will frequently want a high degree of personalization. For example, a user may want the exact details of an object that is imaged in 2D to be preserved in a resulting 3D model or image. The user will also frequently want to be able, in the resulting 3D visualization, to place that object in different backgrounds or settings, also with accurate representation of the original details of that background or setting.

Current intelligence models or generative cores for generating images include Dall-E™ (and Point-E™) by OpenAI™, Stable Diffusion™ and Imagen™ by Google®. A technical problem is that these systems lack the ability to produce or preserve the specific details of an object that the user has in mind when requesting an output image. For example, if a text prompt is used in specifying an image of a person wearing a shirt, the details of the person and the shirt will be determined by the generative AI based on its training and may not resemble the person or shirt that the user wanted to have depicted.

These details can be important to users. For example, a user may want to market a product and want to represent the product accurately in a particular 3D image with a specific background or environment. In another example, the user may want to use 3D imaging to see how a particular product will look and fit into a planned location or environment. In such instances, the user's input may be requests, for example, such as "me holding this cup." "put this couch in my living room," or "put this lamp on top of this nightstand." These examples illustrate specific items that users want to visualize in different personalized environments/contexts.

In such examples, it is important to preserve the details of the object or product or the product's specific appearance and features, such as a company logo. Similarly, it is important to preserve the aspects of the specified background or environment in which the object is to be visualized. If these details are lost in the conversion from 2D imagery to a 3D image, the 3D image is less useful. Again, this is a technical problem in utilizing current image generating technology.

Having a 3D image or model that allows customers to better visualize the size, shape, and overall design of a product they are interested in purchasing can help them make a more informed decision. Additionally, 3D images can provide a more immersive and interactive experience, allowing users to explore and interact with the product in a way that 2D images simply cannot. Another important benefit of viewing 3D images of products before buying them is the ability to see them in different environments and against diverse backgrounds. This can be helpful in many ways. For example, it can help a user better understand how a product will look in their own home or office, or in a specific room or space they have in mind. Additionally, these types of images and models can help users better understand how a product will look when used in a particular context. Again, however, if the 3D image does not capture the details and appearance of the product from the original 2D imagery, these uses of the 3D image are all less effective.

Consequently, the following describes a multimodal system that converts 2D images of an object to a 3D model or image while preserving the details of the object from the 2D image(s) into the 3D model or image to allow users to accurately visualize the object in diverse backgrounds. This is a technical solution to the technical problem described above. In the described technique, the 3D image may be initiated by inputting images and/or text as instructions. The described system consists of an instance segmentation model that identifies the object in 2D imagery that will be converted to a 3D model or image. Then, given the object and user instruction, the system uses a fine-tuned diffusion model for 3D generation that can convert 2D images to 3D models or images and combine the generated 3D models to make the object fit in the specified background in a 3D image or visualization.

This solution can benefit both business owners and their customers. Business owners can input an image of their product in any background. They do not have to input an image containing their product only. Their customers can visualize the product in a general or customized background. A number of specific use cases are given as examples:

1. Given a 2D image of a product (e.g., a surfboard), the user inputs the command "visualize this product on a beach." The output is a 3D model or visualization of the product in the specified background, e.g., the surfboard on a beach.
2. Given a 2D image of a product (e.g., a couch) and an image of a user's living room, the user inputs a command for the product to be visualized in the user's living room. The output is a 3D model or visualization of the couch in the user's living room.

3. Given a 2D image of a product (e.g., a watch), the user inputs an image of the user and a text command: "me wearing the watch on my left wrist." The output is a 3D model or visualization of the user with the watch on the user's left wrist.
4. Given a 2D image of a product (e.g., a necklace), the user inputs a text command: "product under different lighting conditions." The output is a 3D visualization of the product, the necklace, under different lighting conditions.

More specifically, the present approach consists of generating a 2D image of only the object to be included in the output 3D image. If the user starts with an image that includes the desired object and any other objects, an instance segmentation model is used to identify and isolate the desired object in that image and provide an output image of only that object for subsequent processing. The data for the image of the object is implanted in the output domain of the image generating AI model so that it can be associated with a unique identifier. This unique identifier can be an arbitrary text string that would not typically occur in any natural language communication. This "rare text" identifier then represents the corresponding object or subject in the lexicon of the image generating AI model and can thus fine-tune a pre-trained, diffusion-based text-to-image AI model.

More specifically, the disclosed technique fine-tunes a text-to-image model with input images and text cues that contain a unique identifier followed by the category name of the object (e.g., "A [V] hat"), where [V] is the identifier or token associated with image data representing a enables the model to use its prior knowledge of the object's category, while instances of the particular category are bound to the unique identifier.

To prevent the image generating AI model from overfitting to the product image, which may cause the model to be unable to generate an image from the input instruction, the present technique includes a regularization term called prior preservation. This applies an autogenous, class specific loss of a priori preservation, which exploits the semantic prior data about the class embedded in the image generating AI model and encourages the model to generate a semantic prior in the model and to generate different instances of the same object as the output topic with different instances of the same class as the object.

Finally, given the user instruction that also specifies a scene or background (e.g., "a [V] hat under the Golden Gate Bridge"), the technique uses the fine-tuned diffusion model for generating images under a new scene as the text describes. Thus, the model can produce the desired image of the object with the specified background, e.g., the specific hat associated with [V] identifier in a scene where it is under the Golden Gate Bridge. In this example, the model will have training data that allows it to identify the appearance of the famous bridge and represent it accurately in the requested image. However, a background element can also be fine-tuned into the AI model in the same way, i.e., data for an image of the background can be implanted in the output domain of the image generating AI model and associated with a unique identifier.

FIG. 1 depicts an illustrative system in which aspects of this disclosure may be implemented. As shown in the example of FIG. 1 and described above, a user may want to generate a 3D image of a specific object on a particular background or in a specific surrounding scene. The user may have a 2D image 101 that includes the object as well as other objects. The user may also have an image or images 105 of the background or scene on or in which the object is to be depicted.

In this scenario, the 2D image 101 containing the object, along with the textual name of the object 102, is input to instance segmentation model 103. The instance segmentation model 103 is an AI model described in more detail below. Within the overall image, the instance segmentation model 103 will identify the image of the desired object 102, as opposed to other objects in the 2D image. The instance segmentation model 103 is able to do this based on the textual name 102 of the object included in the input and using its training. The instance segmentation model 103 will then remove the image of the object from the input image 101 and output a 2D image 104 that is just of the specified object.

The instance segmentation model or engine 103 is a deep learning AI model that can segment any object in an image or video without requiring any prior knowledge or annotations about the object's shape or appearance. In some implementations, this AI model is based on the Mask R-CNN architecture, which is a type of convolutional neural network that can simultaneously perform object detection, object classification, and instance segmentation. The "Mask" in Mask R-CNN refers to the fact that the algorithm is also capable of producing pixel-level segmentation masks for each detected object. The term "R-CNN" stands for Region-based Convolutional Neural Network, which is the basic architecture of the algorithm. R-CNNs are used as popular and effective approaches for object detection in images.

To remove a specified object from an image using an instance segmentation model, the input image or video is first fed into the model, which uses a series of convolutional layers to extract features from the image. The model then uses these features to identify objects in the image and generate a set of bounding boxes around them. Next, the model generates a set of segmentation masks for each object, which are binary masks that indicate which pixels in the image belong to the object and which do not. These segmentation masks are refined using a technique called iterative box refinement, which helps to improve the accuracy of the segmentation. Finally, the model combines the object detections and segmentation masks to produce the final segmented output, i.e., the 2D image of just the specified object 104. "Segment Anything" from Meta AI is an example of an instance segmentation engine that operates as described. If the user already has an image 104 of just the desired object, this instance segmentation may be unnecessary.

Following instance segmentation, if needed, the user now has as inputs to the AI model for image generation: the 2D image 104 of the object, a 2D image of the background 105 and, optionally, text instructions 106 that can specify the relationship between the object and the background or elements of the background. For example, the text instructions 106 may specify "the couch in the middle of the living room," where the couch is the object depicted in the 2D image 104, and the living room is the background depicted in the background image 105. There is no limit to the various objects, backgrounds and relationships therebetween that the user could specify in the text instructions 106.

As shown in FIG. 1, these three inputs are provided to an image generating AI model 107 that is fine-tuned to recognize and preserve the specific details of the object and background in the output. The fine-tuning of the model will be described in more detail below.

This image generating AI model 107 may be a diffusion model that is trained to output a 3D image 108 that depicts the object in the specified relationship to the desired background. Diffusion models are a type of generative model used in machine learning that simulate the diffusion of information or energy through a system. These models are particularly useful for image generation, as they can generate images that are both diverse and coherent. The basic idea behind diffusion models is to model the process of diffusion using a set of stochastic differential equations. These equations describe the evolution of a set of latent variables over time, which can then be used to generate new samples that are similar to the input data. Thus, diffusion models are able to generate high-quality images that are both realistic and diverse. Unlike traditional generative models, which often suffer from mode collapse or lack of diversity, diffusion models can generate a wide range of images that capture the complexity and richness of real-world data.

One image-generating model that could be used in the system of FIG. 1 is the Stable Diffusion™ model, which was introduced by researchers at OpenAI in 2021. Stable Diffusion™ has been originally trained to produce 2D images, but could be retrained with the same training techniques to produce 3D images for the applications described herein.

Figure 2A:
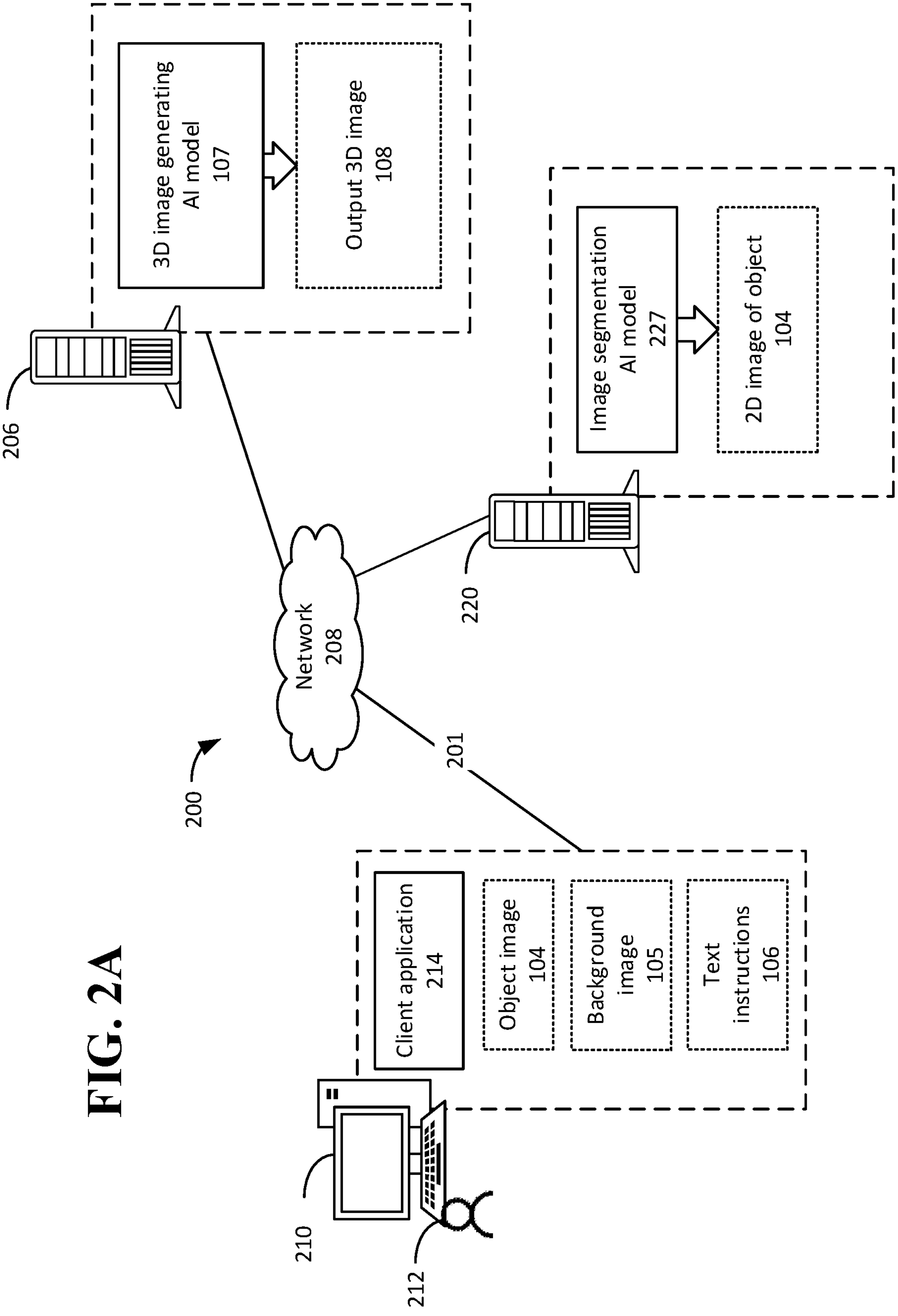
FIGS. 2A and 2B are alternative depictions of the example system of FIG. 1 with additional details.

FIG. 2A depicts additional details of the example system shown in FIG. 1. As shown in FIG. 2A, the user 212 operates a client device 210 to obtain a desired 3D image of an object and background in a specified relationship. The client device 210 can be any type of computer device, such as a laptop, desktop, tablet, smartphone or other end user device. The client device 210 has a client application 214 with which the user can assemble the inputs described above, e.g., an image 104 of a specific object, an image 105 of a desired background and text instructions 106 that specify a relationship between the object and background or that otherwise describe the desired 3D image 108.

When the user only has an image of the object that includes other objects, the application 214 can call an image segmentation AI model 227 to obtain the image 104 that isolates just the desired object, as described above. The client device 210 includes a network interface 201 that provides access, over a network 208, to a server 220 that supports the image segmentation AI model 227. The model 227 can also return the object image 104 to the application 214 via the network 208.

With these inputs, i.e., an object image 104, background image 105 and text instructions 106, as described above, the client application 214 can structure a query to the 3D image generating AI model 107 to produce the desired 3D image 108. The application 214 can call the 3D image generating AI model 107 by accessing a server 206 that supports the model 107 via the network 208. The depicted servers 206 and 220 may represent any number of actual machines that support the respective AI models 107 and 227.

The client application 214 can generate the arbitrary text string or identifier [V] that will be associated with the object of the object image 104 or the background of the background image 105. As described below, the client application 214 can also submit the identifier [V] with the respective image (s) of the object or background to the 3D image generating AI model 107 to fine-tune the model 107, so that the output 3D image 108 is true in appearance to the specific object and background desired by the user 212. Specifically, the data for the image of the object and/or the background is implanted in the output domain of the image generating AI model 107 and associated with a unique identifier. Otherwise, the object and background would be generated according to the entire class of such objects/backgrounds in the training set of the AI model 107 and would not be specific to the inputs of the user 212.

Figure 2B:
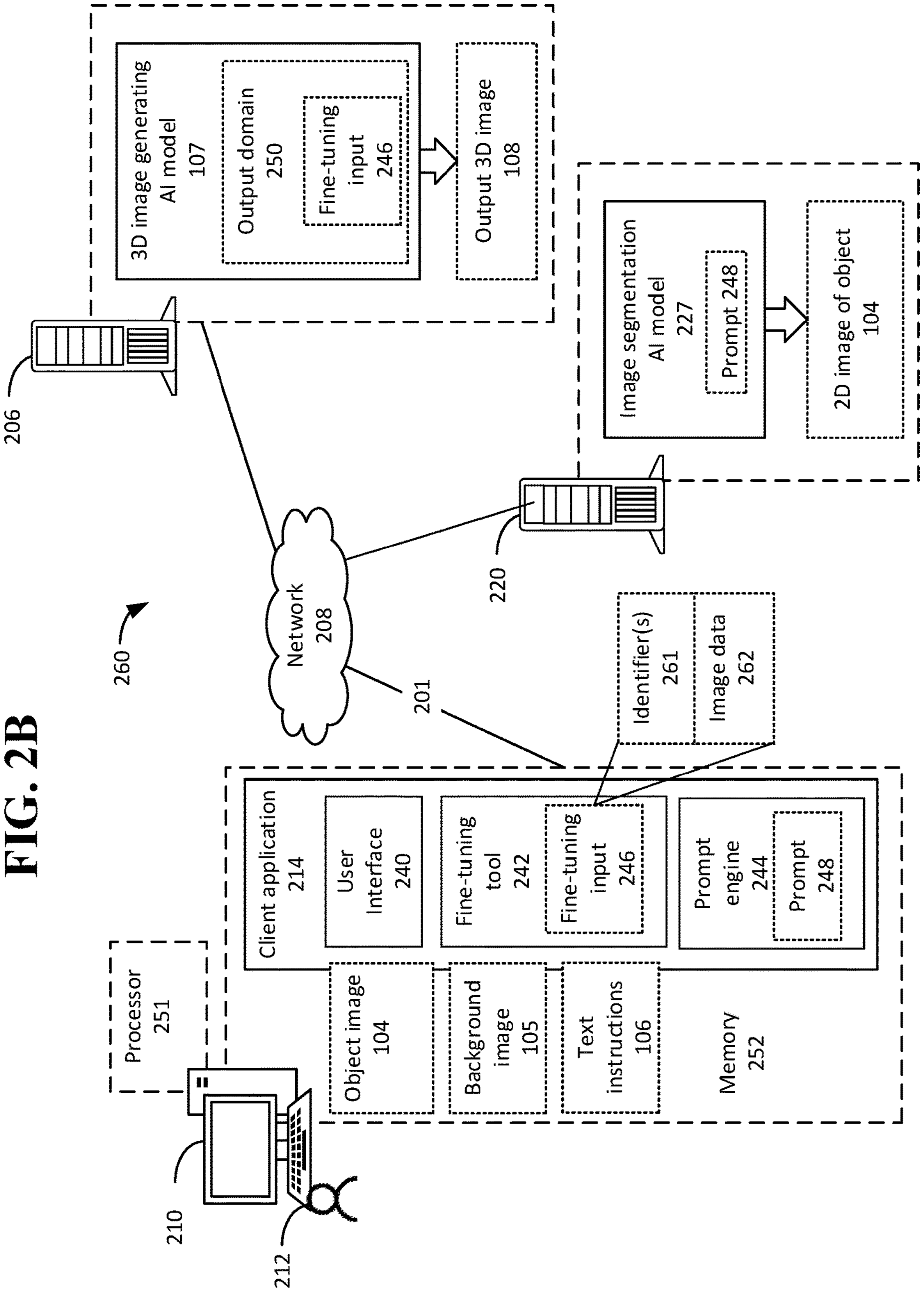

FIG. 2B illustrates some of these additional details of the system 260. As shown in FIG. 2B, the client device 210 is shown including a processor 251 and a memory 252. Examples and details are provided below in connection with FIG. 6. The memory includes the client application 214. Details of the application 214 are provided below in connection with FIG. 5.

As shown in FIG. 2B, the client application 214 includes a user interface 240. The user interface 240 is operated by the user 212 to input the object image 104, the background image 105 and the text instructions 106, as described above. The client application 214 also includes a fine-tuning tool 242. As described above, the fine-tuning tool 242 will generate an identifier [V] 261 for the object of the object image 104. In some examples, the user 212 may proceed using a random background or a standard background description. In examples where a background image 105 is provided, the fine-tuning tool 242 generates another identifier [V] 261 for the background of the background image 105. As described above, image data 262 from the object image 104 and background image 105, along with the respective identifiers 261, are packaged into a fine-tuning input 246. As shown in FIG. 2B, this fine-tuning input 246 is then implanted in the output domain 250 of the AI model 107. This gives the AI model 107 the ability to generate images customized to the user's inputs, as described above.

The client application 214 also includes a prompt generation engine 244. This prompt generation engine 244 will use the text instructions 106 received through the user interface 240 and the identifiers generated by the fine-tuning tool 242 to structure a prompt for the AI model 107. This prompt may specify the relationship between the object and the background or otherwise describe the desired output image 108. The prompt is then sent from the prompt engine 244 via the network 208 to the AI model 107 to produce the output image 108.

The output image 108 or 3D visualization is returned via the network 208 to the client application 214 and displayed for the user 212 in the user interface 214. In some cases, the user 212 may not be fully satisfied with the output image 108. Consequently, the user interface 214 includes further tools and capabilities for manipulating the generated 3D visualization such as lighting changes and presentation in various backgrounds for a more immersive and interactive user experience. Specifically, with the user interface 214, the user can enter additional instructions that describe the desired output image. For example, the user may want a lighting change, a different background, a change in the relationship between the object and background, etc. Any such additional or alternative instruction can be entered by the user 212 in text or other form via the user interface 214. This new instruction is then passed to the prompt engine 244 which incorporates the new instruction into a new prompt that is submitted to the 3D image generating AI model 107 to produce a new output image according to the updated instruction.

Figure 3:
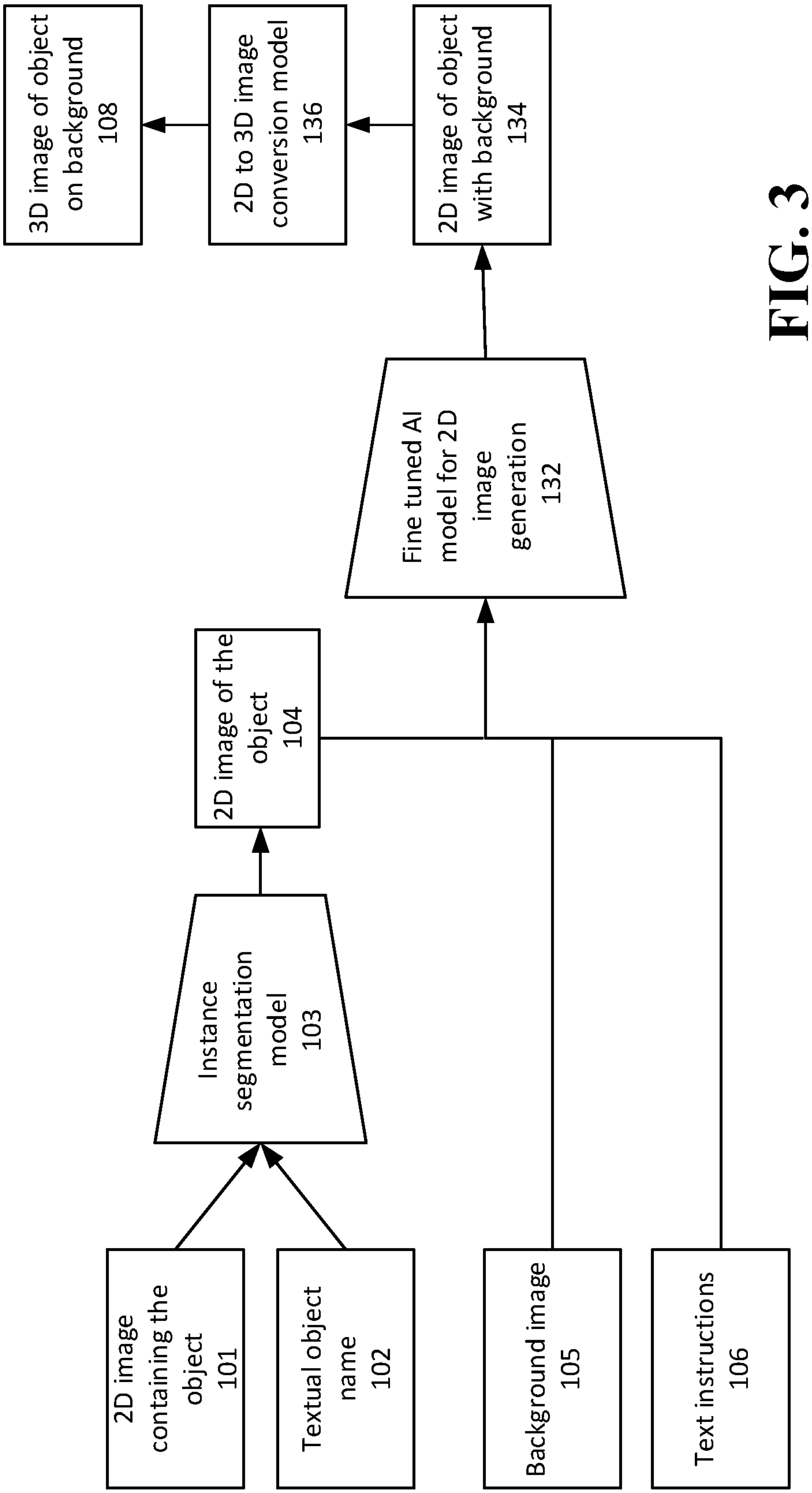
FIG. 3 depicts another alternative system, by way of example, in which aspects of this disclosure may be implemented.

FIG. 3 depicts another example system according to the present disclosure. The system of FIG. 3 is similar to that of FIG. 1. However, in FIG. 3, the three inputs of the object image 104, the background image 105 and the text instructions 106 are input to an AI model 132 for generating 2D images. Possible examples of the model 132 include, but are not limited to, Dall-E™ (and Point-E™) by OpenAI™, Stable Diffusion™ and Imagen™ by Google®. In any case, the model 132 is again fine-tuned, as further described below, to preserve the details and appearance of the object and background when producing an output 2D image 134. As before, the text instructions 106 can specify a relationship between the object and background or otherwise describe the 2D image 134 that is produced of the object with the background.

This 2D image 134 is then input to a 2D-to-3D image conversion model 136 to generate the 3D image of the object on the background 108 that the user desired. This model 136 can be an AI model like those described herein that is trained for converting a 2D image to a 3D image. In some examples, the model 136 will convert the 2D image into a 3D model and then produce the 3D image from the 3D model, as described herein.

As noted above, the disclosed technique can fine-tune an AI model with input images and text cues that contain a unique identifier followed by the category name of the object (e.g., "A [V] hat"), where [V] is the identifier or token associated with image data representing a enables the model to use its prior knowledge of the object's category, while instances of the particular category, i.e., the specific hat that the user has imaged, are bound to the unique identifier. Thus, the model can produce the desired 3D image of the object with the specified background, the 3D image being true to the appearance of the specified object and background.

The fine-tuning of a pre-trained AI image-generating model will now be described in further detail. This technique can be applied to an image generating model that is trained to produce either a 2D or 3D image. In the example of FIG. 1, the AI model 107 is pretrained to produce 3D images from the described inputs, e.g., an object image 104, a background image 105 and text instructions 106. In the example of FIG. 3, the AI model 132 is pretrained to produce 2D images based simply on a text instruction or on the same three inputs. However, image generating AI models will generate the appearance of an object or a background based on all the images in that class from its training data. This will not produce an output image that preserves the appearance or details of the specific object or background desired by the user without the fine-tuning described here using the object image 104 and/or background image 105.

In the case of either or both of the object and background, a special identifier is generated, represented herein as [V]. As noted above, this identifier or unique identifier can be an arbitrary text string that would not typically occur in any natural language communication. This "rare text" identifier will then represent the corresponding object or background in the lexicon of the image generating AI model. For example, [V] is a special text identifier in the system, such as the string 'sks.' If the object is a hat, a text instruction invoking the specific hat associated with this identifier could be "a photo of sks hat." The AI model will then output an image, not just of any hat, but an image of the specific hat associated with the identifier "sks." Again, the identifier could be any text string, arbitrarily, such as a very rare string or word that would not be used in a common sentence.

In the inference stage of a diffusion model, the identifier is used to indicate the image data for that specific person, object or scene with which it has been associated for the AI model. In another example, for generating a specific person in a pencil sketch, the prompt to the image generating AI engine could be "a sks person in pencil sketch."

For all the images that a user has provided for one instance, i.e., an object or background, the identifier [V] is fed into in a text encoder to fine-tune the AI model. Thus, the model learns to understand that the [V] identifier indicates the instance that the user wants.

The association between the identifier and the image(s) provided by the user is learned by the image generating AI model in two steps. In the first step (a), a low-resolution text-to-image model is fine-tuned with input images that are paired with a text prompt containing the identifier or unique identifier and the name of the subject's class. This step also includes applying a class-specific prior preservation loss to generate diverse instances belonging to the subject's class. In the second step (b), super resolution components are fine-tuned with pairs of low-resolution and high-resolution images from the input image set, ensuring high-fidelity to small details of the subject. Thus, during fine-tuning, the AI model, such as a diffusion model, sees the original image content (person/product) plus the rare word identifier, and the reference class images. A back-propagated loss adjusts weights in the image generating AI model and associates the identifier with that particular person/product profile generation, while understanding that it is an instance that belongs to the reference class.

In another example scenario, the user wants to generate the image of a person using a person class. The image generating AI model, e.g., a diffusion model, will generate many different images of people. Within that significantly large/almost infinite possible generation space, there is one sub-generation space that looks like a particular person. During finetuning, the AI model is given the person's image(s) and the specific identifier. The AI model then learns to trigger the subspace generation for that particular person's appearance when the identifier is presented in a text prompt.

Figure 4A:
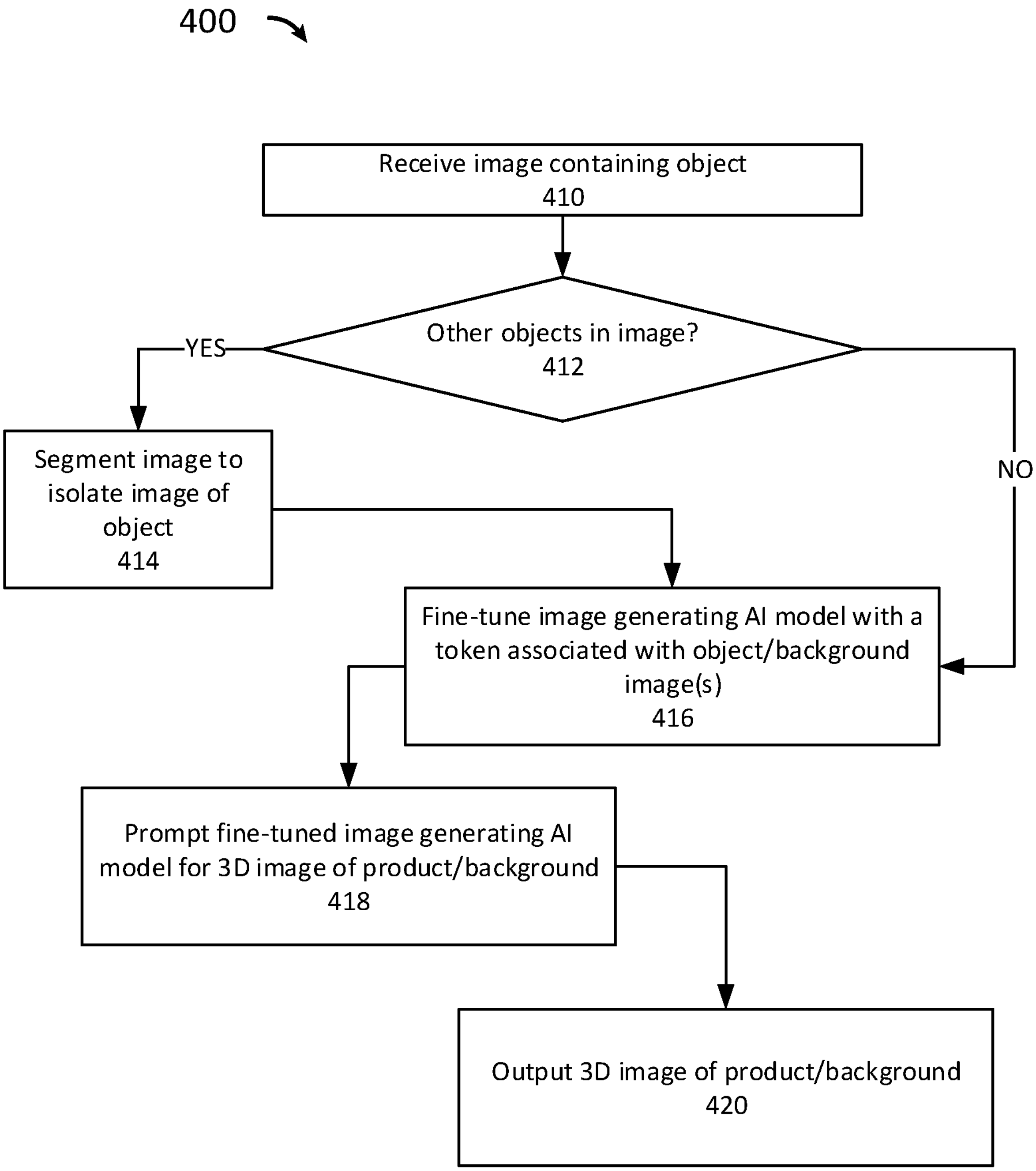
FIGS. 4A and 4B are flowcharts depicting example methods of implementing aspects of this disclosure.

FIG. 4A is a flowchart illustrating an example method according to the present disclosure. The flow of FIG. 4A can be used with the system illustrated in FIG. 1 or 2, for example. As shown in FIG. 4A, the method begins, at step 410, with receiving a 2D image of the object with which the user wants to work in a 3D image or visualization. In some instances, there may be other superfluous objects in the image. This is determined at step 412.

If there are other superfluous objects in the image, as described above, instance segmentation is performed, at step 414, to isolate the image of the object of interest. The result is a 2D image of just that object. These same steps (410-414) may also be performed with regard to an image of the desired background.

The image generating AI model is then fine-tuned, at 416, as described above by using the identifiers associated with the image(s) of the object or background. Once fine-tuned, the method prompts, at 418, the image generating AI for a 3D image of the object with the background. This prompt, as described above, may specify a relationship between the object and background or otherwise describe the 3D image to be produced. The method concludes by outputting of the desired 3D image of the object and background per the instructions of the user, at 420. As described above, the user can then utilize the 3D image in any of a wide variety of applications.

Figure 4B:
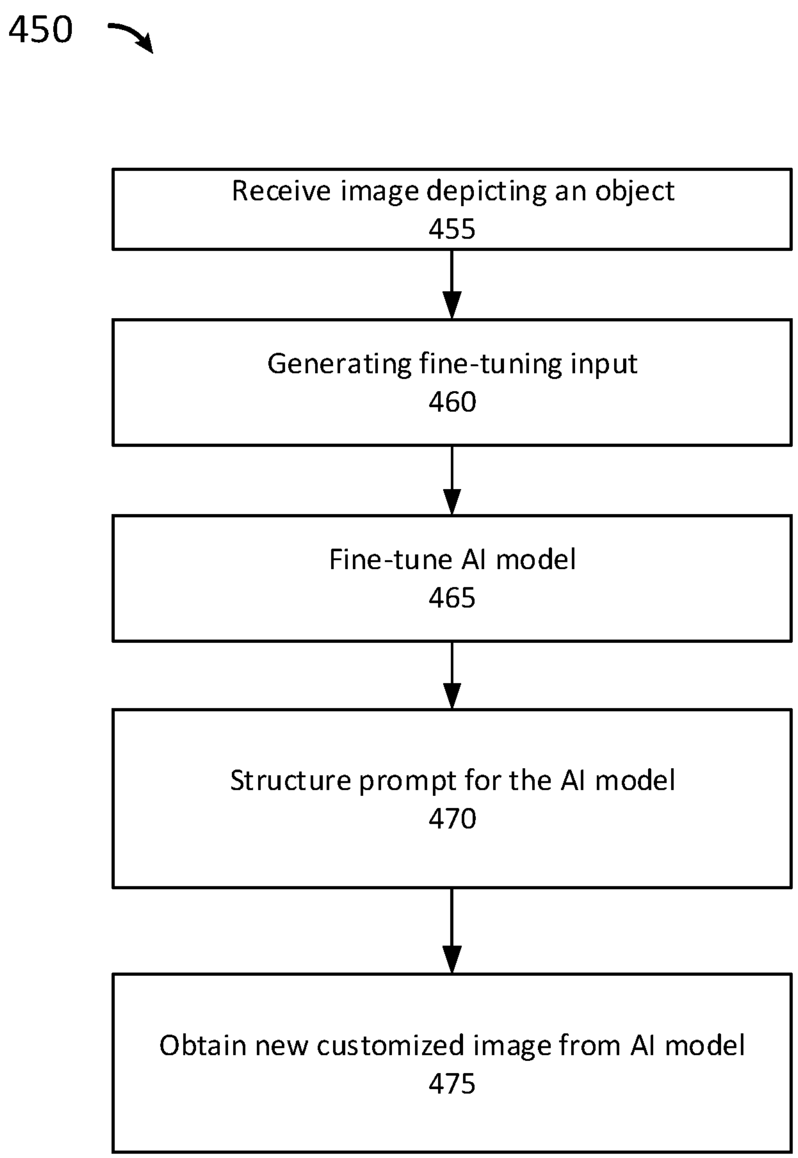

FIG. 4B is another flowchart illustrating an example method according to the present disclosure. As shown in FIG. 4B, the method of this example includes receiving, at 455, an image depicting an object; generating, at 460, a fine-tuning input to an image-generating AI model to associate image data of the object with an identifier; with the fine-tuning input, fine-tuning, at 465, the AI model; structuring, at 470, a prompt for the AI model using the identifier;

and obtaining, at 475, from the AI model a new customized image that depicts the object while preserving an appearance of the object.

Aspects and applications of the methods and system described herein include: (1) generating 3D scenes based on a single image; (2) multimodal generation of images in which users can input images and text; (3) personalized 3D generation; (4) fitting a 3D object in a 3D scene; (5) allowing different manipulations on the generated image (change lighting, in paint part of the product/background); and (6) efficient and low-cost finetuning for diffusion models.

Figure 5:
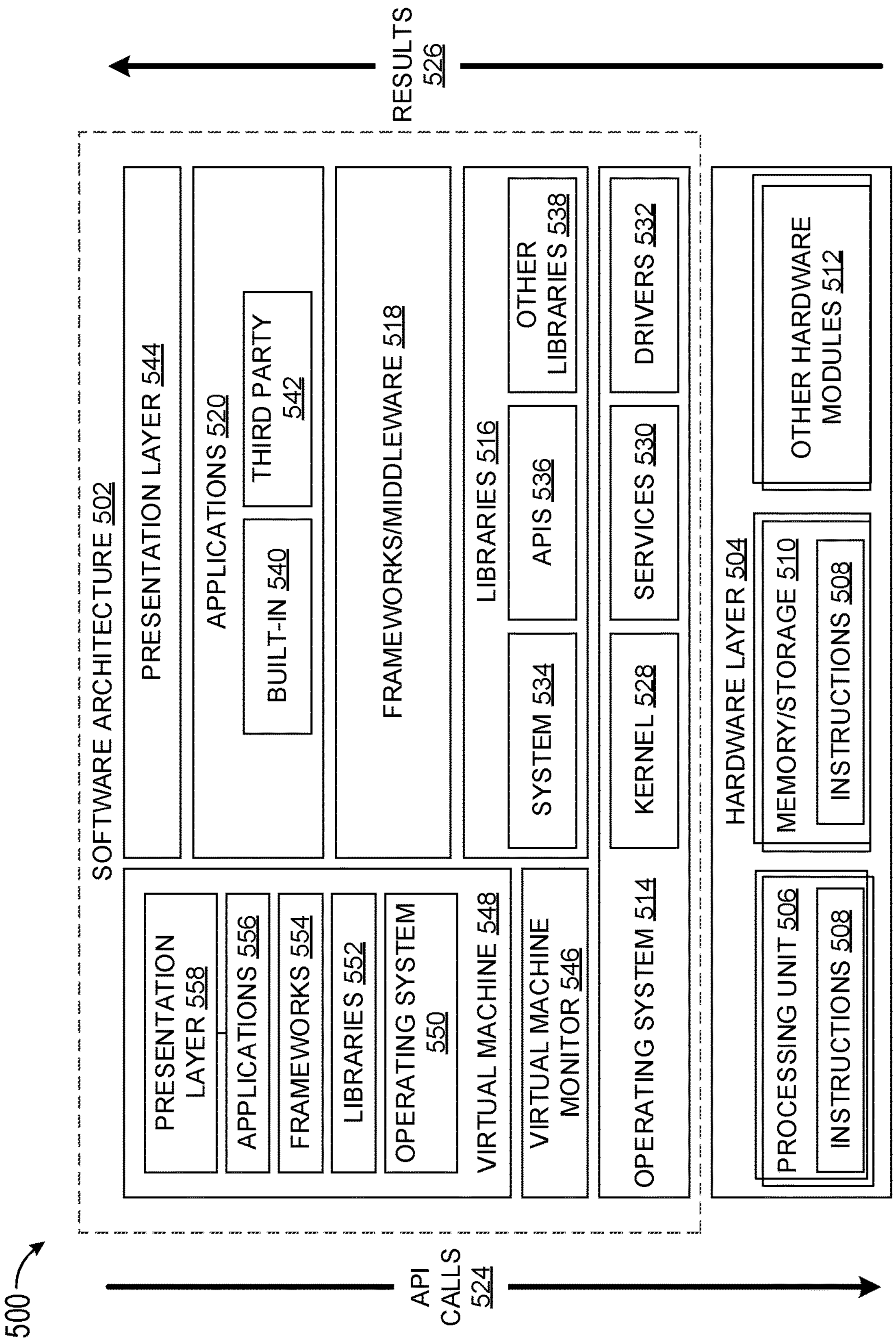
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. The software architecture of FIG. 5 may be used for the client application described or for the image generating AI engine also described above.

FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
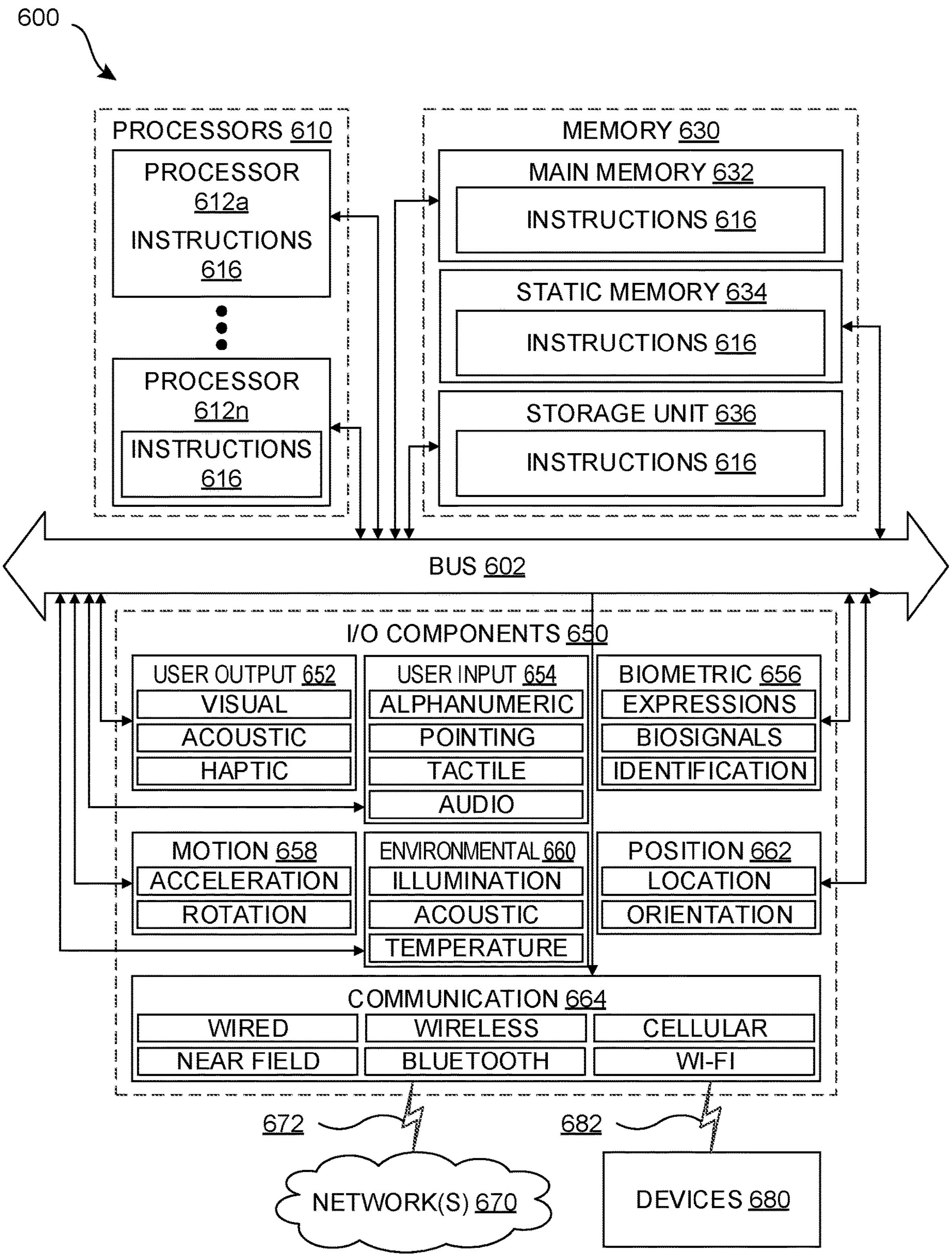
FIG. 6 is a block diagram illustrating components of an example machine configured to read instructions from a machine-readable medium and perform any of the features described herein.

FIG. 6 is a block diagram illustrating components of an example machine 600. The machine 600 may be used to implement the client device or the server described above.

The machine 600 is configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising;

a processor;

a memory storing executable instructions which, when executed by the processor, cause the processor, alone or in combination with other processors, to implement a client application with a user interface to:

receive a two-dimensional image depicting an object;

generate a fine-tuning input to an image-generating Artificial Intelligence (AI) model to associate image data of the object with an identifier;

with the fine-tuning input, fine-tune the AI model;

structure a prompt for the AI model using the identifier; and obtain from the AI model a new customized image that depicts the object while preserving an appearance of the object.

Item 2. The data processing system of Item 1, the AI model being trained to output a three-dimensional (3D) image based on the prompt.

Item 3. The data processing system of Item 1, wherein the user interface of the client application is configured to receive textual user input describing the customized image, the application to structure the prompt for the AI model based on the user input.

Item 4. The data processing system of Item 1, wherein the client application is further to receive an image depicting a background in which the object is to be visualized in the customized image, wherein the fine-tuning input further comprises association of image data of the background with a second identifier.

Item 5. The data processing system of Item 4, wherein the client application is further to structure the prompt for the AI model using the identifiers for both the image data of the object and background such that the customized image depicts the object and background.

Item 6. The data processing system of Item 4, wherein the user interface of the client application is configured to receive textual user input describing a relationship between the object and background to be used in generating the customized image.

Item 7. The data processing system of Item 1, wherein the client application is to call an instance segmentation service to produce the image depicting the object from a different image depicting the object along with other image content.

Item 8. The data processing system of Item 1, wherein the client application is to obtain from the AI model a new customized image that depicts the object while preserving an appearance of the object, the customized image being a two-dimensional image, the client application to then call a service to convert the two-dimensional image into a three-dimensional image.

Item 9. A non-transitory computer-readable medium comprising instructions for a client application for execution by a processor, alone or in combination with other processors, the client application comprising;

a user interface to receive input images and input text;

a fine-tuning tool to generate a fine-tuning input to an image-generating Artificial Intelligence (AI) model to associate image data of an object with an identifier using an image of the object input through the user interface;

the fine-tuning tool to implant the fine-tuning input in an output domain of the AI model; and a prompt engine to structure a prompt for the AI model using the identifier and to obtain from the AI model a new customized image that depicts the object based on the prompt while preserving an appearance of the object.

Item 10. The medium of Item 9, the AI model being trained to output a three-dimensional (3D) image based on the prompt.

Item 11. The medium of Item 9, wherein the user interface of the client application is configured to receive textual user input describing the customized image, the prompt engine to structure the prompt for the AI model based on the user input.

Item 12. The medium of Item 9, wherein the client application is further to receive an image depicting a background in which the object is to be visualized in the customized image, wherein the fine-tuning input further comprises association of image data of the background with a second identifier.

Item 13. The medium of Item 12, wherein the fine-tuning tool of the client application is further to structure the prompt for the AI model using the identifiers for both the image data of the object and background such that the customized image depicts the object and background.

Item 14. The medium of Item 12, wherein the user interface of the client application is configured to receive textual user input describing a relationship between the object and background to be used generating the customized image.

Item 15. The medium of Item 10, wherein the user interface includes tools for instructing the prompt engine to generate a new prompt for a new 3D image after viewing a first 3D image, the new prompt revising lighting, background or other element of the first 3D image.

Item 16. The medium of Item 9, wherein the client application is to obtain from the AI model a new customized image that depicts the object while preserving an appearance of the object, the customized image being a two-dimensional image, the client application to then call a service to convert the two-dimensional image into a three-dimensional image.

Item 17. A method of generating a customized three-dimensional image, the method comprising;

receiving an image depicting an object;

generating a fine-tuning input to an image-generating Artificial Intelligence (AI) model to associate image data of the object with an identifier;

with the fine-tuning input, fine-tuning the AI model;

structuring a prompt for the AI model using the identifier; and obtaining from the AI model the customized three-dimensional image that depicts the object while preserving an appearance of the object.

Item 18. The method of Item 17, the AI model being trained to output a three-dimensional (3D) image based on the prompt.

Item 19. The method of Item 17, further comprising:

receiving textual user input describing the customized image; and structuring the prompt for the AI model based on the user input.

Item 20. The method of Item 17, further comprising:

receiving an image depicting a background in which the object is to be visualized in the customized image; and with the fine-tuning input, specifying an association of image data of the background with a second identifier.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising;

a processor;

a memory storing executable instructions which, when executed by the processor, cause the processor, alone or in combination with other processors, to implement a client application with a user interface to:

receive a two-dimensional image or a video depicting a desired object and a textual name of the desired object among other objects, wherein the desired object in combination with the textual name is a product having a specific appearance;

provide the two-dimensional image or the video to an instance segmentation model to produce object image data of only the desired object from the two-dimensional image or the video based in part on the textual name of the desired object;

generate a fine-tuning input to an image-generating Artificial Intelligence (AI) model to associate the object image data with a rare text identifier;

with the fine-tuning input, fine-tune the AI model;

structure a prompt for the AI model using the rare text identifier; and obtain from the AI model a customized three-dimensional (3D) image that depicts the desired object while preserving the specific appearance of the product.

2. The data processing system of claim 1, wherein the user interface of the client application is configured to receive the textual user input describing the customized 3D image, the client application to structure the prompt for the AI model based on the textual user input.

3. The data processing system of claim 1, wherein the client application is further to receive background image data depicting a background in which the desired object is to be visualized in the customized 3D image, wherein the fine-tuning input further comprises an association of the background image data with a second identifier.

4. The data processing system of claim 3, wherein the client application is further to structure the prompt for the AI model using the rare text identifier and the second identifier such that the customized 3D image depicts the desired object and the background.

5. The data processing system of claim 3, wherein the user interface of the client application is configured to receive textual user input describing a relationship between the desired object and the background to be used in generating the customized 3D image.

6. A non-transitory computer-readable medium comprising instructions for a client application for execution by a processor, alone or in combination with other processors, the client application comprising;

a user interface to receive a two-dimensional image or a video depicting a desired object and a textual name of the desired object among other objects, wherein the desired object in combination with the textual name is a product having a specific appearance;

an instance segmentation model coupled to receive the two-dimensional image or the video and produce object image data of only the desired object from the two-dimensional image or the video based in part on the textual name of the desired object;

a fine-tuning tool to generate a fine-tuning input to an image-generating Artificial Intelligence (AI) model to associate the object image data with a rare text identifier and to implant the fine-tuning input in an output domain of the AI model; and a prompt engine to structure a prompt for the AI model using the rare text identifier and to obtain from the AI model a customized three-dimensional (3D) image that depicts the desired object based on the prompt while preserving the specific appearance of the product.

7. The medium of claim 6, wherein the user interface of the client application is configured to receive textual user input describing the customized 3D image, the prompt engine to structure the prompt for the AI model based on the textual user input.

8. The medium of claim 6, wherein the client application is further to receive background image data depicting a background in which the desired object is to be visualized in the customized 3D image, wherein the fine-tuning input further comprises an association of the background image data with a second identifier.

9. The medium of claim 8, wherein the fine-tuning tool of the client application is further to structure the prompt for the AI model using the rare text identifier and the second identifier such that the customized 3D image depicts the desired object and the background.

10. The medium of claim 8, wherein the user interface of the client application is configured to receive the textual user input describing a relationship between the desired object and the background to be used in generating the customized 3D image.

11. The medium of claim 6, wherein the user interface includes tools for instructing the prompt engine to generate a new prompt for the customized 3D image after viewing the customized 3D image, the new prompt revising a lighting, a background or other element of the customized 3D image.

12. A method of generating a customized three-dimensional image, the method comprising;

receiving a two-dimensional image or a video depicting a desired object and a textual name of the desired object among other objects, wherein the desired object in combination with the textual name is a product having a specific appearance;

providing the two-dimensional image or the video to an instance segmentation model to produce object image data of only the desired object from the two-dimensional image or the video based in part on the textual name of the desired object;

generating a fine-tuning input to an image-generating Artificial Intelligence (AI) model to associate the object image data with a rare text identifier;

with the fine-tuning input, fine-tuning the AI model;

structuring a prompt for the AI model using the rare text identifier; and obtaining from the AI model a customized three-dimensional (3D) image that depicts the desired object while preserving the specific appearance of the product.

13. The method of claim 12, the AI model being trained to output the customized 3D image based on the prompt.

14. The method of claim 12, further comprising:

receiving textual user input describing the customized 3D image; and structuring the prompt for the AI model based on the textual user input.

15. The method of claim 12, further comprising:

receiving background image data depicting a background in which the desired object is to be visualized in the customized 3D image; and with the fine-tuning input, specifying an association of the background image data with a second identifier.

* * * * *